United States Patent
Turner et al.

(10) Patent No.: US 9,621,682 B2
(45) Date of Patent: *Apr. 11, 2017

(54) REDUCED LATENCY MEDIA DISTRIBUTION SYSTEM

(71) Applicant: Qualcomm Technologies International, Ltd., Cambridge (GB)

(72) Inventors: Richard Turner, Belfast (GB); Laurent Wojcieszak, Belfast (GB)

(73) Assignee: Qualcomm Technologies International, Ltd., Cambridge (GB)

( * ) Notice: Subject to any disclaimer, the term of this patent is extended or adjusted under 35 U.S.C. 154(b) by 120 days.

This patent is subject to a terminal disclaimer.

(21) Appl. No.: 14/729,214

(22) Filed: Jun. 3, 2015

(65) Prior Publication Data
US 2015/0271298 A1   Sep. 24, 2015

Related U.S. Application Data

(63) Continuation of application No. 13/660,416, filed on Oct. 25, 2012, now Pat. No. 9,060,183.

(51) Int. Cl.
*H04L 29/06*     (2006.01)
*H04N 21/438*   (2011.01)
(Continued)

(52) U.S. Cl.
CPC ........ *H04L 67/42* (2013.01); *G06F 17/30371* (2013.01); *G06F 17/30864* (2013.01); *H04L 43/0852* (2013.01); *H04L 67/104* (2013.01); *H04L 69/16* (2013.01); *H04N 21/23406* (2013.01); *H04N 21/242* (2013.01); *H04N 21/4302* (2013.01); *H04N 21/4384* (2013.01); *H04N 21/6373* (2013.01); *H04N 21/8547* (2013.01)

(58) Field of Classification Search
CPC .......... G06F 15/16; G06F 15/173; G06F 9/46; G06F 11/00; H04N 7/173; H04N 7/16; H04N 7/12; H04L 51/26; H04L 51/04
USPC ......................................... 709/203
See application file for complete search history.

(56) References Cited

U.S. PATENT DOCUMENTS 9,060,183 B2   6/2015   Turner et al.
2006/0009983 A1   1/2006   Magliaro et al.
(Continued)

FOREIGN PATENT DOCUMENTS

| EP | 1294193 | 3/2003 |
| WO | WO 2007/133697 | 11/2007 |
| WO | WO 2010/090732 | 8/2010 |

OTHER PUBLICATIONS

GB Search Report for GB Appln. 13187199.0, dated Apr. 16, 2014.
(Continued)

*Primary Examiner* — Tu Nguyen
(74) *Attorney, Agent, or Firm* — Paradice and Li LLP

(57) ABSTRACT

A system for distributing audio or video data across a network, wherein an input data rate controller at a server controls the transmission rate to a client such that it matches the intended rendering rate of the data, and time stamps the data using a clock that is synchronized with the clock of the client. The client monitors the rate at which data is received, compares the rate against the rate at which the data is actually rendered, and adjusts the rate at which the data is actually rendered depending on the comparison.

25 Claims, 8 Drawing Sheets

(51) Int. Cl.
*H04N 21/234* (2011.01)
*H04N 21/242* (2011.01)
*H04N 21/43* (2011.01)
*H04N 21/6373* (2011.01)
*H04N 21/8547* (2011.01)
*G06F 17/30* (2006.01)
*H04L 12/26* (2006.01)
*H04L 29/08* (2006.01)

(56) References Cited

U.S. PATENT DOCUMENTS

| | | | |
|---|---|---|---|
| 2006/0104397 A1 | 5/2006 | Lottis et al. | |
| 2008/0271095 A1 | 10/2008 | Shafton | |
| 2009/0204842 A1 | 8/2009 | Tetik et al. | |
| 2010/0325193 A1 | 12/2010 | Baldwin | |
| 2011/0202637 A1 | 8/2011 | Delahaye | |
| 2013/0091223 A1 | 4/2013 | DeLuca et al. | |
| 2013/0198745 A1* | 8/2013 | De | G06F 9/45533 718/1 |
| 2013/0325193 A1* | 12/2013 | Shah | F24F 11/006 700/277 |

OTHER PUBLICATIONS

Office Action for U.S. Appl. No. 13/660,416, dated Oct. 31, 2014.
Notice of Allowance for U.S. Appl. No. 13/660,416, dated Feb. 20, 2015.

* cited by examiner

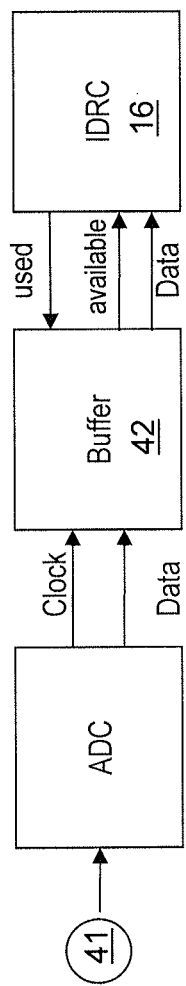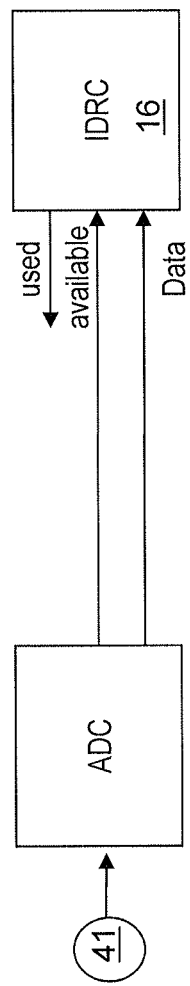

REDUCED LATENCY MEDIA DISTRIBUTION SYSTEM

CROSS REFERENCE TO RELATED APPLICATIONS

This application is a continuation application of, and claims priority under 35 USC 120 to commonly owned U.S. Pat. No. 9,060,183 entitled "REDUCED LATENCY MEDIA DISTRIBUTION SYSTEM" filed Oct. 25, 2012, the entirety of which is incorporated by reference herein.

FIELD OF THE INVENTION

The present invention relates to media distribution systems especially audio and/or video systems in which digital data is communicated from a server device to a client device across a communications link.

BACKGROUND TO THE INVENTION

Home media systems are evolving to include multiple media devices (servers or renderers) spread across multiple rooms. It is increasingly important that the content is rendered at a precisely controlled time for each device irrespective of the transport mechanism chosen to transmit from the server device to the rendering device (e.g. a wired, wireless, power line or other communication link). Another issue in building a home media network system is to provide the ability to easily scale by dynamically adding or removing server and rendering devices. It is desirable for this to be achieved whilst providing a rapid response to user events (e.g. pressing play, pause, and so on) irrespective of the source type (e.g. line-in, local media, internet streaming, and so on). Conventional systems do not satisfy three key constraints simultaneously: tight time synchronization, low latency media streaming and the ability to easily and dynamically scale the system.

Conventionally, systems needing tight synchronization between rendering devices use handshaking protocols such as the Real Time Streaming Protocol (RTSP), in addition to implementing large data buffers at network reception points. Synchronization is conventionally implemented in full at the network reception points. Large buffers are used to store enough data to allow smooth audio playback whilst handling the complex communication required to stall the server if those buffers are about to be full. Handshaking makes low-latency and flexible operation difficult to achieve with conventional approaches.

It would be desirable therefore to provide an improved media distribution system.

SUMMARY OF THE INVENTION

A first aspect of the invention provides a system for distributing data from at least one server to at least one client in communication across a network, wherein said at least one server comprises:
at least one input for receiving data from a data source, said data being associated with an intended rendering rate at which said data is intended to be rendered;
at least one input data rate controller configured to control a transmission rate at which said source data is sent from said at least one server to said at least one client via said network; and wherein said at least one client comprises:
at least one input for receiving data from said at least one server via said network; and
at least one output data controller configured to control rendering of said received data; and
wherein said at least one input data rate controller is configured to control said transmission rate to match or substantially match said rendering rate, and to associate with said data time data derived from a respective clock signal, and wherein said at least one output data controller is configured to use said time data to control the rendering of said data.

Said output data controller may be cooperable with synchronization means configured to allow synchronization of said time data with a respective clock signal of said at least one client. Said synchronization means typically comprises clock signal synchronization means configured to provide said at least one server and said at least one client with respective synchronized clock signals. Advantageously, said at least one output data controller is configured to use said time data and its respective synchronized clock signal to control the rendering of said data.

In preferred embodiments, said at least one output data controller is configured to use said time data to synchronize said rendering of said data with the transmission of said data from said at least one server to said at least one client via said network. Said at least one output data controller may be configured to synchronize said rendering of said data with said transmission of said data by comparing said time data with respective time data at which the data is rendered and to determine if said rendered time data is consistent with said time data. Typically, said at least one output data controller is configured to adjust the rate at which said data is rendered to remove or reduce any determined inconsistency between said rendered time data and said time data.

Preferably, said at least one output data controller is configured to cause the rate at which said data is rendered to match or substantially match said transmission rate.

Typically, said output data controller is configured to monitor the rate at which said data is received at said at least one client, to compare said rate against the rate at which said data is actually rendered at said at least one client and to adjust the rate at which said data is actually rendered at said at least one client depending on said comparison.

In preferred embodiments, in respective of successive portions, for example packets, of said data, said output data controller is configured to compare the respective time data created by said input data rate controller against the time at which the respective portion of said data is actually rendered, in order to determine if said data is being rendered at the intended rendering time or rate.

Typically, said output data controller is configured to reduce said actual rendering rate upon determining that said receiving data rate is less than said actual rendering rate.

Advantageously, said at least one output data controller is configured to use said time data to determine when said data is rendered. Typically, said output data controller is configured cause the rendering of said data to begin at a time corresponding to the time indicated in the time data of a first received portion of said data plus a time delay that is greater than or equal to a latency caused by system when sending data between the respective server and the respective client. In particular said output data controller may be configured cause the rendering of said data to begin at a time corresponding to the time indicated in the time data of a first received portion of said data plus a time delay corresponding to the latency of the system between the respective input data rate controller and respective output data controller.

In typical embodiments, any one or more of said at least one servers sends said data simultaneously to a respective plurality of said clients, and wherein a respective output data controller of each client is configured to use said time data to synchronize the respective rendering of said data at the respective clients.

In cases where said data is received from said data source at a fixed rate corresponding to said intended rendering rate, said at least one input data rate controller may be configured to control said transmission rate to match or substantially match said fixed rate.

In cases where said data source comprises a data file, said at least one input data rate controller may be configured to control said transmission rate to match or substantially match a rendering rate associated with said file.

In cases where said data is received in a data stream across a network from said data source, said at least one input data rate controller may be configured to control said transmission rate to match or substantially match a rendering rate associated with or derived from said data stream.

In preferred embodiments, said input data rate controller is configured to cause said source data to be sent from said at least one server to said at least one client via said network at a substantially constant rate. Said output data controller is preferably configured to cause said received data to be rendered at a substantially constant rate.

In typical embodiments, said network comprises a local area network (LAN) and/or a personal area network (PAN). Typically, said source data comprises audio data and/or video data.

A second aspect of the invention provides a method for distributing data from at least one server to at least one client across a network, wherein said method comprising:
receiving data from a data source, said data being associated with an intended rendering rate at which said data is intended to be rendered;
controlling a transmission rate at which said source data is sent from said at least one server to said at least one client via said network to match or substantially match said rendering rate;
prior to transmission across said network, associating with said data time data derived from a clock signal at said at least one server;
receiving data from said at least one server at said at least one client via said network; and
using said time data to control the rendering of said data.

A third aspect of the invention provides a system for distributing data from at least one server to at least one client in communication across a network, wherein said at least one server comprises:
at least one input for receiving data from a data source, said data being associated with an intended rendering rate at which said data is intended to be rendered;
at least one input data rate controller configured to control a transmission rate at which said source data is sent from said at least one server to said at least one client via said network; and wherein said at least one client comprises:
at least one input for receiving data from said at least one server via said network; and
at least one output data controller configured to control rendering of said received data; and
wherein said at least one input data rate controller is configured to control said transmission rate to match or substantially match said rendering rate, and to associate with said data time data derived from a respective clock signal, and wherein said at least one output data controller is configured to monitor the rate at which said data is received at said at least one client, to compare said rate against the rate at which said data is actually rendered at said at least one client, and to adjust the rate at which said data is actually rendered at said at least one client depending on said comparison.

Typically, said at least one output data controller is configured to adjust the rate at which said data is actually rendered at said at least one client to match or substantially match said transmission rate.

A fourth aspect of the invention provides a method for distributing data from at least one server to at least one client across a network, wherein said method comprising:
receiving data from a data source, said data being associated with an intended rendering rate at which said data is intended to be rendered;
controlling a transmission rate at which said source data is sent from said at least one server to said at least one client via said network to match or substantially match said rendering rate;
prior to transmission across said network, associating with said data time data derived from a clock signal at said at least one server;
receiving data from said at least one server at said at least one client via said network;
monitoring the rate at which said data is received at said at least one client;
comparing said rate against the rate at which said data is actually rendered at said at least one client;
and adjusting the rate at which said data is actually rendered at said at least one client depending on said comparison.

Embodiments of the invention are particularly but not exclusively suited for use with home media systems. Other applications include vehicle entertainment systems or any personal area network.

Further advantageous aspects of the invention will become apparent to those ordinarily skilled in the art upon review of the following description of a preferred embodiment and with reference to the accompanying drawings.

BRIEF DESCRIPTION OF THE DRAWINGS

An embodiment of the invention is now described by way of example and with reference to the accompanying drawings in which:

FIG. 5A is a block diagram of the input data rate controller connected to a constant bit rate source via a buffer;

FIG. 5B is a block diagram of the input data rate controller connected to a constant bit rate data source without the buffer;

DETAILED DESCRIPTION OF THE DRAWINGS

Figure 1:
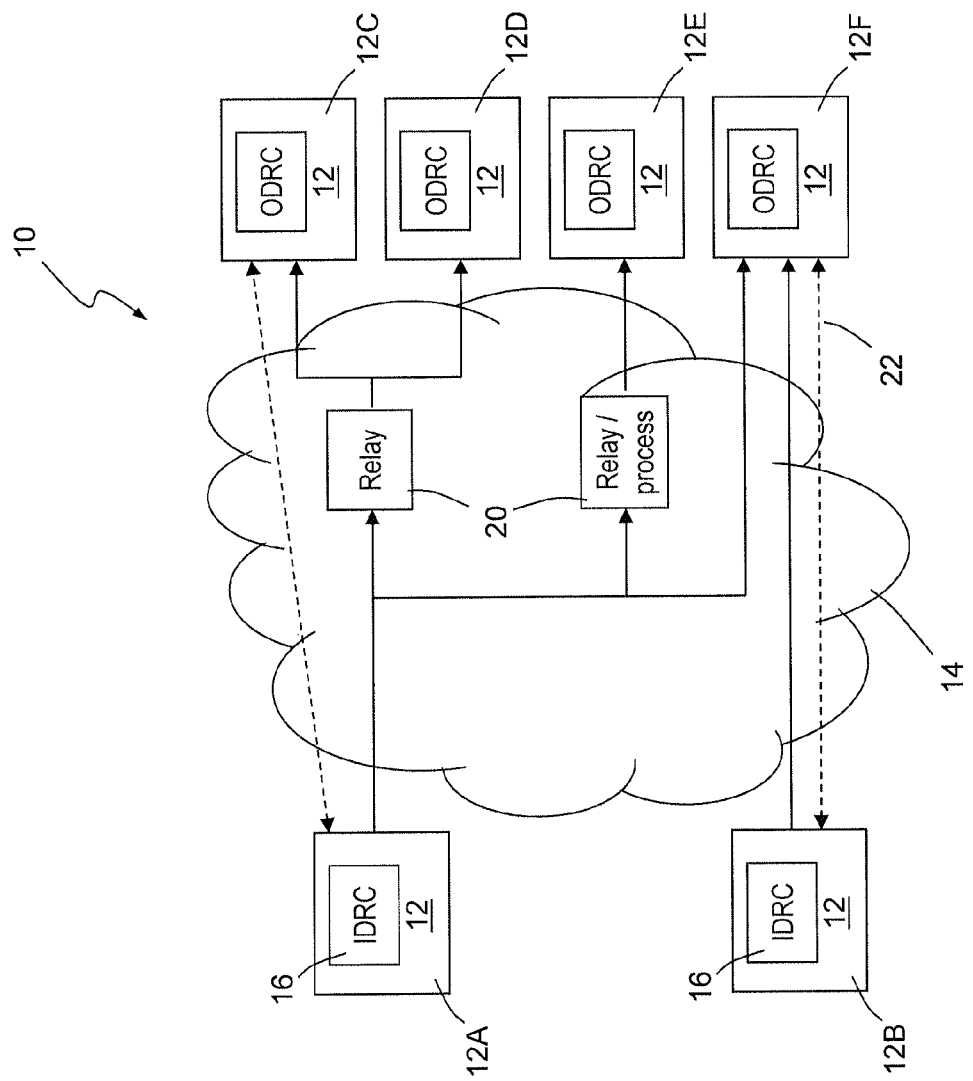
FIG. 1 is a block diagram of a media distribution system embodying one aspect of the invention.

Referring now to FIG. 1 of the drawings there is shown generally indicated as 10, a media distribution system comprising a plurality of host devices 12 an a communications network 14 by which the devices 12 can communicate with one another. The network 14 may include wired and/or wireless communication link(s) and the system may support any one or more convenient communication protocols and standards, for example Ethernet, Wifi and/or Bluetooth. In typical embodiments, the network comprises a Local Area Network (LAN) and/or a Personal Area Network (PAN).

Each host device 12 typically comprises a computing device that is capable of receiving, distributing, transmitting, storing and/or rendering digital traffic data signals depending on its function within the network 14. The traffic data signals typically comprise audio and/or video data. By way of example, each host device 12 may be any one or more of a computer (e.g. PC or server), audio player, video player, television, telephone (in particular a smart phone) or router. Each host device 12 may be configured to act as a server and/or as a client. When acting as a server, the host 12 receives traffic data from a source and transmits it via network 14 to one or more other host 12 acting as a client. When acting as a client, the host 12 receives traffic data from one or more other server hosts 12 and renders (e.g. plays and/or displays to a user) the traffic data.

As is described in further detail hereinafter, to act as a server the host 12 includes one or more input data rate controller (IDRC) 16, and to act as a client, the host 12 includes one or more output data rate controller (ODRC) 18. In FIG. 1, for the purposes of illustration, the hosts 12A, 12B on the left side are assumed to act as servers while the hosts 12C to 12F on the right side are assumed to act as clients.

In the example of FIG. 1, the IDRC 16 of host 12A is supplying a data traffic signal to the respective ODRC 18 of multiple hosts 12C to 12F, while the IDRC 16 of host 12B is supplying a data traffic signal to the ODRC 18 of only one host 12F. More generally, the IDRC 16 may send one or more data traffic signals (comprising the same or different content) to one or more ODRCs 18.

Optionally, the traffic signals may be sent via a relay and/or other processing device 20. The processing and/or relay devices 20 may be configured to perform any processing required by the system, e.g. change the encoding of the data traffic and/or act as a relay to address a bandwidth requirement. In other embodiments, the hosts 12 may include one or more IDRCs 16 and/or one or more ODRCs 18. Each IDRC 16 may be said to comprise an input to the distribution system 10 in that it provides a point at which the traffic data to be distributed enters the distribution system. Each ODRC 18 may be said to comprise an output from the distribution system 10 in that it provides a point at which the traffic data leaves the distribution system.

The setup and management of the distribution network 14 is performed by one or more management modules (not shown). The network 14 may comprises a central management module for managing all of the hosts 12 and their inter-communications, but in the illustrated embodiment it is assumed that each host 12 includes a management module for managing its communications with other hosts 12. The distributed management modules communicate via respective management channels 22 supported by the network 14 between respective hosts 12. Management functions may include monitoring network performance and adjusting network parameters as appropriate, e.g. monitoring the bandwidth of an inter-host connection and selecting a different codec to reduce bandwidth required, or monitoring the time for a packet of data to travel through the network and adjusting the time at which the data traffic stream should be rendered at the client host.

Conventionally, the hosts employ a handshaking protocol for controlling the flow of data. To simplify setup and data management, and as is described in more detail hereinafter, systems embodying the invention advantageously removes the need for a handshaking protocol by matching the rate at which data is supplied to the network 14 by the IDRC 16 of a server host 12 to the rate at which data is consumed by the ODRC 18 of the respective client host 12. This removes the need for the IDRC 16 to manage information about each of the hosts 12 it is supplying a stream of data traffic. Instead it can use a simple "send and forget" data stream management scheme making management of the system 10 simpler and changes to its topology easier.

For example, if a handshaking protocol is used (for example RTSP or TCP) the content of the data traffic stream that is sent to a client has to be tracked and start/stop messages needs to be handled for multiple streams. For a system with multiple ODRCs each receiving the same content by a respective individual stream, if one ODRC requests that its stream is stopped then the data needs to be buffered so that the other streams can continue being supplied to the other ODRCs, and when the ODRC requests that its stream is restarted, none of the content of the stream is lost. Another example where management can be relatively difficult is in a wireless system where packets maybe delayed by up to 0.5+ seconds. In this case, if an ODRC needs to stop the stream, there needs to be enough buffering at the output to store any of the stream that was received after the stop message was sent.

Preferred embodiments of the present invention provide means for a server host 12 to send data traffic signals (especially digital media, e.g. audio and/or video, signals) to multiple clients 12, and for the clients to render the media in a time synchronized manner. The server and client devices are connected across the network by a wired or wireless communication link and communicate using a network protocol.

Figure 2:
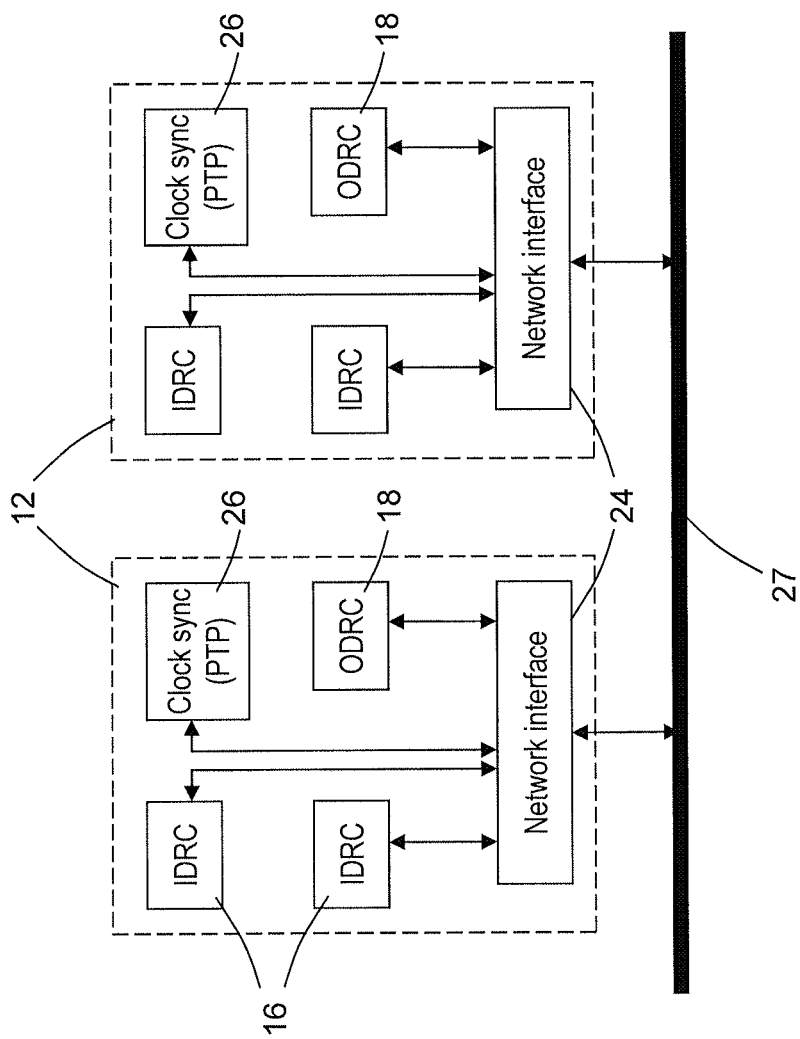
FIG. 2 is a block diagram showing two host devices forming part of the system of FIG. 1.

FIG. 2 shows two host devices 12 in more detail. In this example, each host 12 includes at least one IDRC 16 and at least one ODRC 18 and so may act as a server or a client. Other hosts 12 may include only one or more IDRC or only one or more ODRC, and be capable of acting only as a server or a client respectively. Each host 12 supports a network interface 24 which may include supporting one or more network protocols, which may be standard e.g. UDP or TCP.

The IDRCs 16 and ODRCs 18 use the respective network interface 24 to send and/or receive traffic data signals to and from one another via a communications link 26 supported by network 14.

Each host 12 also includes a clock synchronization module 26 for causing the hosts 12 to operate using a synchronized clock signal. The clock synchronizer 26 may for example support Precision Time Protocol (PTP) as defined in IEEE1588. In order to perform clock synchronization, the respective modules 26 may communicate with each other across the network 14 via communications link 26 (typically using a different channel than the traffic data) and the interfaces 24. More generally, all of the hosts 12 of the system include a clock synchronization module 26 for causing the hosts 12 to operate using a synchronized clock signal. Clock synchronization allows the hosts 12 to share a common clock. Any form of synchronization mechanism can be used for this purpose.

Figure 3:
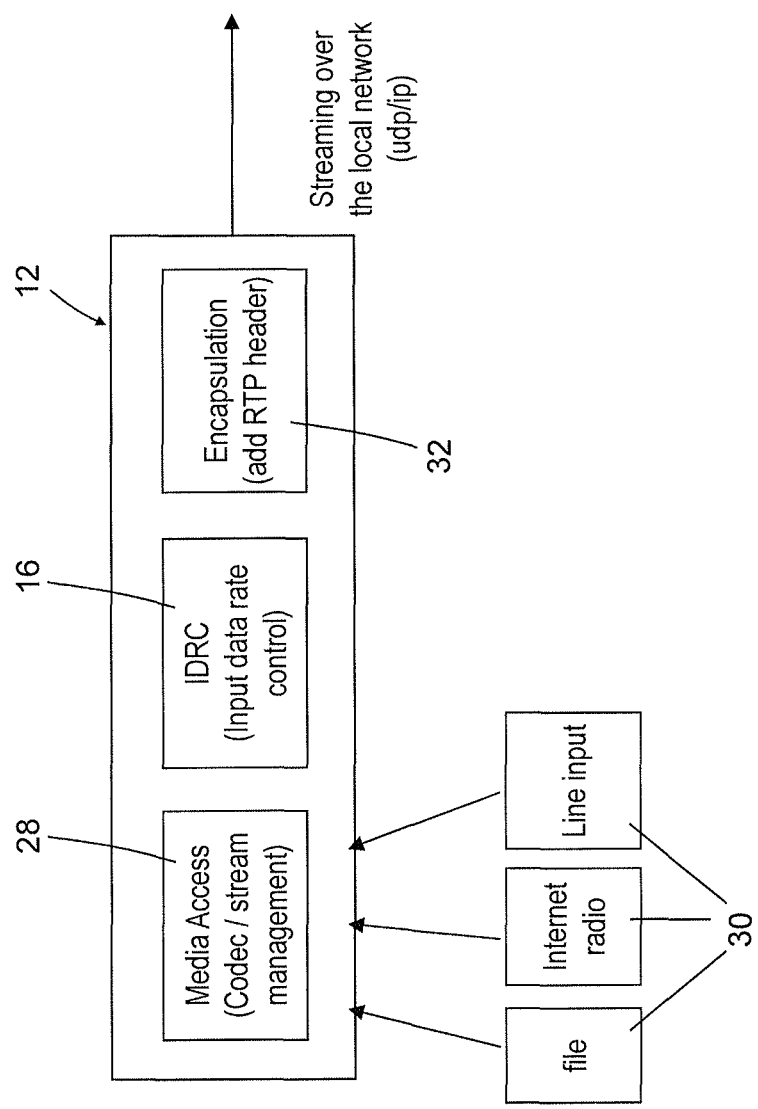
FIG. 3 is a block diagram of server related components of a host device included in the system of FIG. 1.

FIG. 3 shows server related components of a host 12, in particular components used in creating a traffic data stream for sending to a client. A media access/processing module 28 receives data from one or more data source 30, which may take any conventional form, typically providing digital audio and/or video data for transmission to one or more clients. For example, the source data may comprise any one or more of an audio and/or video input, e.g. from an ADC (which may be part of the host or part of an external device), a data stream from a server across the internet, or a digital audio and/or video file stored locally on the host 12. More generally, the source data comprises data that is intended for rendering as a data stream (e.g. audio and/or video data), and which is conveniently transmitted from one host to another as a stream. The processing module 28 may perform any stream management (for example buffering, encoding/decoding) that may be required. It is noted that the data sources 30 may be part of the host 12 (depending on the nature of the host) or may be connected to the host 12 by a wired or wireless connection.

Advantageously, and as is described in more detail hereinafter, the IDRC controls the rate of data flow from the source to match, or substantially match, the rate at which the respective client(s) need to render the traffic data. Accordingly, the client(s) receive the traffic data signal from the network 14 at a rate that matches or substantially matches the desired rendering rate. This arrangement reduces or prevents problems arising at the client from lack of data, or a requirement at the client to buffer a relatively large amount data.

The output of the IDRC 16 is passed to an encapsulation module 32 which creates a data signal from the source data that is suitable for sending across the network 14, i.e. encapsulates the data in a form suitable for transmitting across the network 14, e.g. in accordance with one or more protocols being used to support the transmission. The encapsulation module 32 is configured to add, or otherwise associate, a timestamp to the data signal to be passed over the commutation link 26. For example, the encapsulation module 32 may be configured to format the source data by adding or otherwise associating a respective header, conveniently an RTP header, with each packet, or otherwise associating overhead data with each packet or other data portion, e.g. frame, the header/overhead comprising the respective timestamp. In some embodiments, it may not be necessary for the encapsulation module to perform any task other than the addition of the timestamps.

The hosts 12 may include one or more media processing components (for example one or more codecs and/or data compression modules) for processing the traffic data before transmission or after receipt, but these are not shown for reasons of clarity since they are not necessary for an understanding of the invention.

Figure 4:
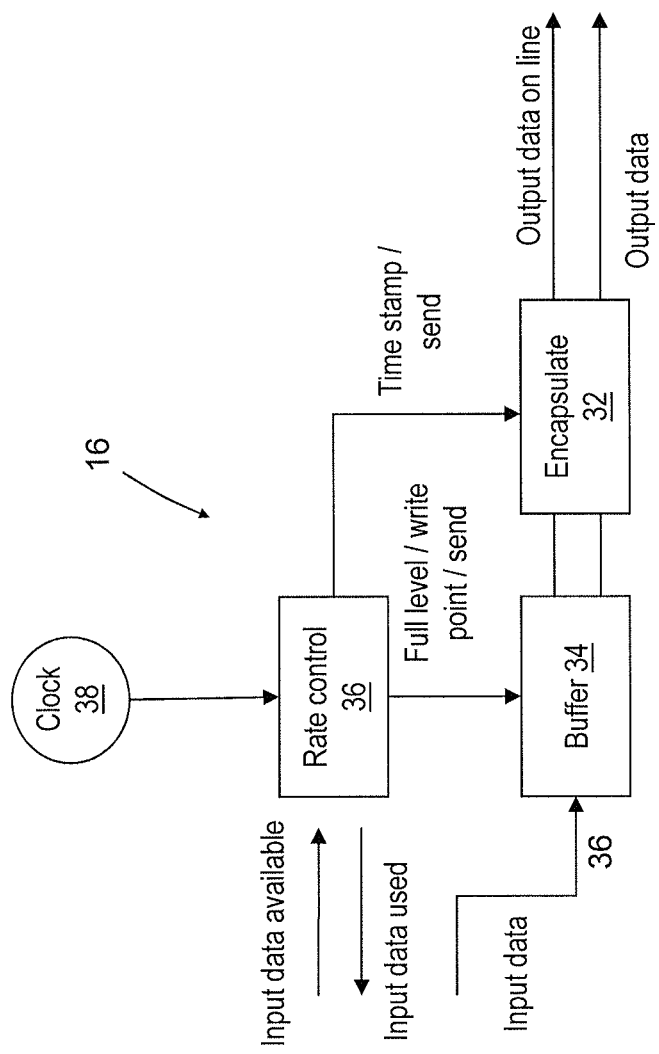
FIG. 4 is a block diagram of a preferred input data rate controller being one of the components of FIG. 3.

FIG. 4 shows an exemplary implementation of the IDRC 16 in conjunction with the encapsulation module 32. The IDRC 16 includes a data buffer (memory) 34 having an input 36 for receiving the source traffic data from a source 30. The IDRC 16 also includes a controller 36 that controls the filling of the buffer 34 with data from the source 30, and controls when the data in the buffer 34 is output from the buffer 34. In this example, data is output from the buffer 34 to the encapsulation module 32. The controller 36 typically communicates with the source 30 (not shown in FIG. 4) that supplies the source data from which it may receive an indication of when data is ready to be sent to the buffer 34. The controller 36 may also communicate to the source 30 when it is ready to receive data, e.g. when the buffer is empty or below a threshold level. The source 30 may be part of the host 12, or may be an external source device, e.g. audio player or other source data server.

The controller 36 controls the level to which the buffer 34 is filled with source data and/or the timing of the output of data from the buffer 34 in order to control the rate, e.g. bit rate, typically the average bit rate, at which data is output from the IDRC 16 and therefore the rate, e.g. bit rate, typically average bit rate, at which the traffic data signal is transmitted from the host 12. Advantageously, the controller 36 operates to match or substantially match the bit rate of the data signal transmitted from the host 12 to the bit rate that is required by the respective client(s), and in particular the rate at which the client(s) are required to render the data. The controller 36 advantageously also controls the flow of data such that the flow of data across the network 14 is at a substantially constant rate. In the illustrated embodiment, the controller 36 uses the host clock signal 38 (which is synchronized with the clock signals of the other hosts 12) to control the timing of the filling with data of and/or outputting data from the buffer 34 in order to control the output rate from the buffer 34. This allows the amount of data output from the host 12 to be limited. The preferred operation of the controller 36 creates a relatively smooth data flow, i.e. sent continuously rather than in bursts, and preferably at a substantially constant rate.

The controller 36 also provides timing data to the encapsulation module 32 to enable the timestamp to be applied to the outgoing data traffic signal. Conveniently, the encapsulation module 32 adds the timestamp to the data traffic signal as part of its encapsulation process. For example, where encapsulation involves creating data packets, the timestamp may be incorporated into the packet header. Alternatively where encapsulation involves creating data frames the timestamp may be incorporated into the data frames.

When the encapsulation module 32 sends the traffic data signal onto the network 14, it may also send an associated control signal to indicate that the traffic signal is being sent.

Since the traffic data signal is sent at a controlled rate that matches, or substantially matches, the rate at which the client(s) render the data, there is no need for the receiving client(s) to acknowledge the traffic data signal sent by the server host 12, nor do the client(s) have to limit the quantity of data received from the server. Accordingly, relatively complex handshaking protocols or relatively large buffers at the client input are not required.

In typical embodiments, irrespective of the type of media (source data) to be streamed between the server and the client devices (including pre-recorded media, streamed media and captured media), the digital media may be characterized by its bit rate, typically its average bit rate. The IDRC 16 may use this characteristic and the synchronized clock 38 to regulate the flow, in particular the rate of flow and preferably also the smoothness of the flow, of traffic data being sent across the network 14. The server may also monitor one or more system metrics (e.g. buffer levels at the server and/or client(s)) to provide more accurate control of the data flow. Typically, the traffic data is sent in packets and a timestamp is applied to each packet (e.g. added to the header) indicating at which time the packet was created. The time is derived from the synchronized clock 38.

FIG. 5A shows an example where the IDRC 16 receives the source data from a source 30 that provides, e.g. streams, the source data at a fixed bit rate. In this example the source 30 is assumed to comprise an analogue-to-digital converter (ADC) which itself receives source data from an analogue data output device 41, for example a microphone. When the IDRC 16 receives source data at a fixed rate (that is also the rate at which the data is to be rendered) then the IDRC 16 controls the data flow to match or substantially match the bit rate of the fixed rate source, i.e. ADC output bit rate in this example.

In FIG. 5A, the source data is sent to the IDRC 16 via a buffer 42 that provides temporary data storage. The IDRC 16 may communicate with the buffer to indicate when it is ready to receive data, and the buffer 42 may indicate when data is available. The constant bit rate source 30 may send a clock signal to the buffer to control the transfer of data to the buffer 42. The IDRC 16 and source 30 may implement any convenient handshaking protocol via the buffer 42 to control the flow of data between them.

In cases where the source 30 sends the source data in a relatively smooth manner, e.g. sent continuously rather than in bursts, the buffer 42 can be omitted and the source data can be sent directly from the source 30 to the IDRC 16. This is possible since the average flow rate of data from the output device 41 matches the data flow across the network 14.

Figure 6:
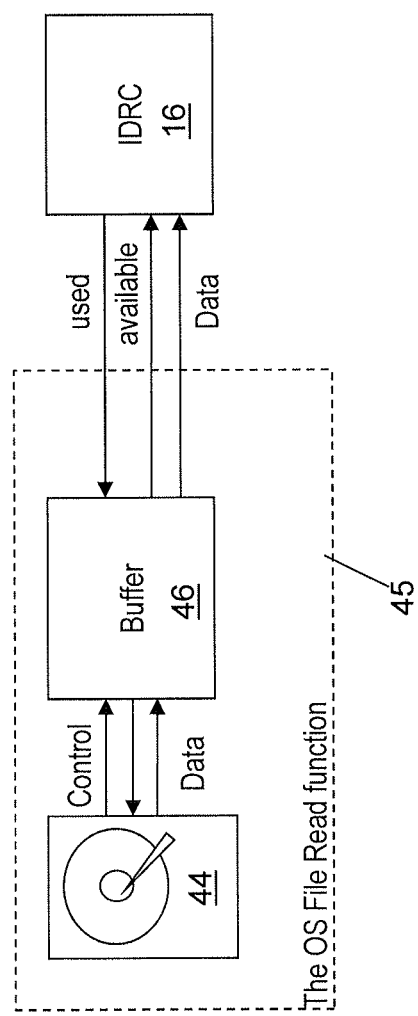
FIG. 6 is a block diagram of the input data rate controller connected to an off line source.

In FIG. 6, the source data is sent to the IDRC 16 from an off-line source, for example a data file 44 stored on a computing device 46 (e.g. an audio player) that supports an operating system (OS) that allows the file to be accessed for rendering. In FIG. 6, it is assumed that the computing device 46 is separate from the host 12 that includes the IDRC 16, but connected by a wired or wireless communication link. Alternatively, the computing device 46 may be, or be part of the host 12 that includes the IDRC 16.

In cases where the source data is stored, e.g. in file 44, such that the whole content is accessible all at the same time, e.g. if file 44 is on a hard drive, there is no inherent mechanism to limit the rate at which the source data is streamed from the file. In this case, the IDRC 16 limits the rate of flow of source data to itself from the file 44 to match the rate at which it is to be rendered. Normally there is information about the format of the data in the file 44 (i.e. WAV, AVI, MPEG), and from this information the required data rendering rate can be obtained and passed to the IDRC 16. A buffer 46 may be provided between the IDRC 16 and the file 44 to allow the IDRC 16 to control the rate at which data is streamed from the file 44. Normally an OS will have a function (for example POSIX file function) that allows data to be read from a file. This function and supporting system (e.g. OS) may maintain the buffer 46 for storing data segments from the file 44.

Figure 7:
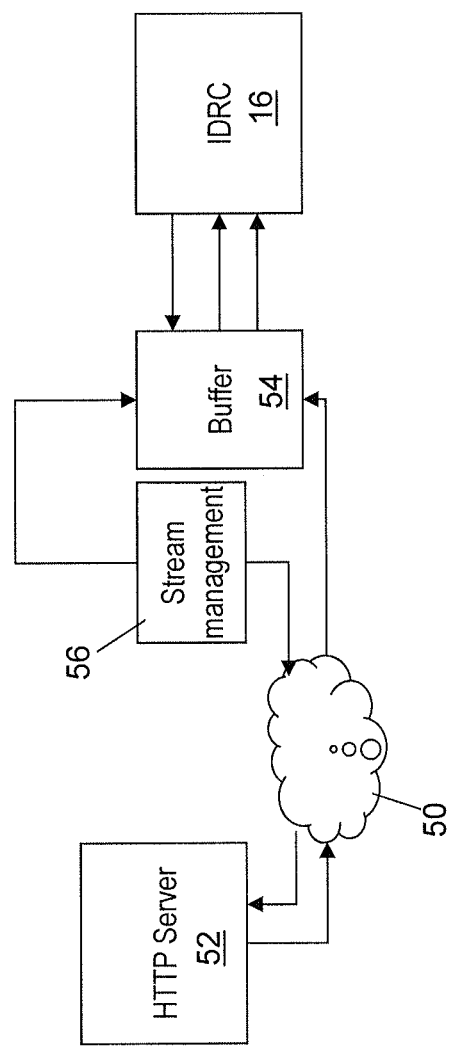
FIG. 7 is a block diagram of the input data rate controller connected to a streaming data source.

In FIG. 7, the source data is streamed to the host 12, and therefore to the IDRC 16, across a network 50, for example a mobile (cellular) telephone network, the internet or other communications network. The source data is typically stored on a server 52, e.g. an http server, and may for example comprise streamed audio and/or video data. The rate at which the source data is streamed across the network 50 tends to substantially match or be higher than the rate at which the data is required to be rendered, and may also be delivered in chunks or bursts rather than smoothly. For such cases, the preferred IDRC 16 is provided with means for smoothing and controlling the incoming rate of data flow in order that it can transmit the data across network 14 at the desired rate (i.e. the required rendering rate, which can be obtained from the incoming data stream in any convenient conventional manner). This may be achieved by providing, conveniently at the server host 12, a buffer 54 and a stream management module 56 between the network 50 and the IDRC 16. The stream management module 56 may take any convenient form and be configured in any convenient manner to control the storage of the streamed source data in the buffer 54. The IDRC 16 controls the rate at which the data is taken from the buffer 54 to allow it to send the data across the network 14 at the desired rate.

Figure 8:
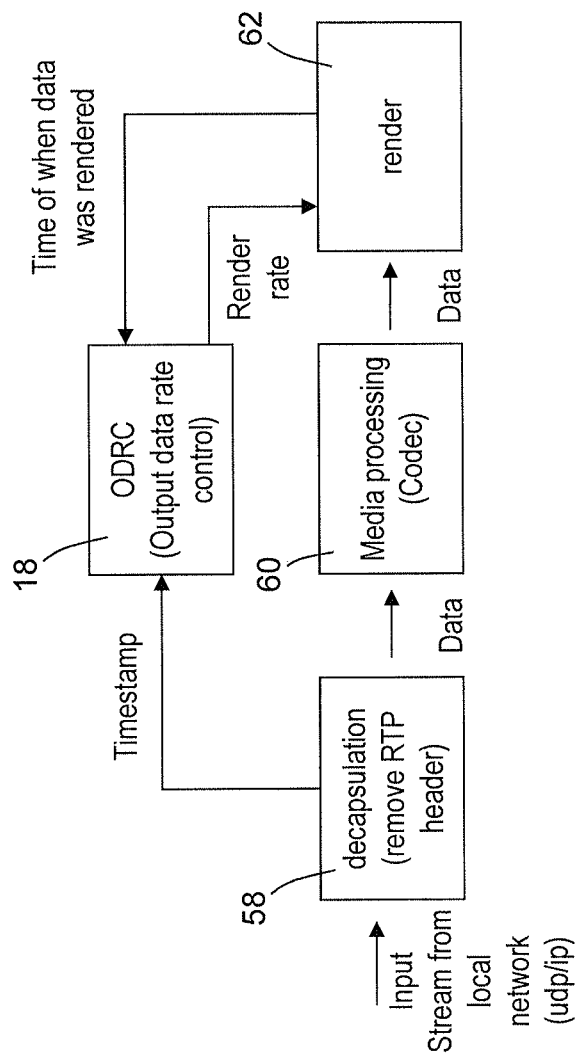
FIG. 8 is a block diagram of client related components of a host device included in the system of FIG. 1.

Referring now to FIG. 8, there is shown client related components of a host 12, in particular components used in receiving a traffic data stream from the network 14 for rendering. In addition to the ODRC 18, there is shown a decapsulation module 58 that receives the incoming traffic data stream from the network 14 and recovers the traffic data, or source data, from the stream. The decapsulation process is the counterpart of the encapsulation process performed by module 28 at the server (and in some embodiments may involve only recovery of the timestamps). The decapsulation module 58 recovers the timestamps from the incoming data stream and passes these to the ODRC 18. A processing module 60 may be provided (if necessary) to perform any processing of the data, e.g. decoding or decompression, that is required before rendering. A rendering module 62 receives the recovered traffic data, after processing 60 if applicable, and renders the data. The rendering module 62, which may for example comprise an audio and/or video rendering device, is required to render the data at an intended rendering rate (which may for example be specified in overhead data associated with the traffic data).

As described above, the action of the IDRC 16 advantageously causes the rate at which the data is received from the network 14 by the client 12 to match or substantially match the intended rendering rate. In the first instance, the ODRC 18 determines the time at which the rendering of the traffic data by the rendering module 62 should begin by adding a time delay (corresponding to a measured or calculated value representing the latency of data travelling from the respective IDRC to the respective ODRC). At the determining start time, the ODRC 18 causes the rendering module 62 to render the data at the nominal intended rendering rate (which it may for example have obtained from overhead accompanying the traffic data). Subsequently, the ODRC 18 is configured to control the actual render rate as necessary to remove or reduce any differences between the rate at which the data is received from the network 14 by the client 12 and the actual render rate, in particular to cause actual render rate to match or substantially match the rate at which the IDRC 16 transmitted the data. Advantageously, this has the effect of synchronizing the rendering of the data at the client to the transmission of the data at the server (the synchronization incorporating the respective latency between the IDRC and ODRC).

In preferred embodiments, the ODRC 18 is configured to obtain the required render rate (e.g. from overhead associated with the incoming traffic stream) and the timestamp information for the incoming traffic data (which may conveniently be obtained from the overhead, e.g. packet headers, associated with the incoming traffic stream, or derived from the timestamp information) and the time at which the data is rendered by the renderer 62. The ODRC 18 compares the time at which data packets are rendered (as measured by the synchronized clock) against the respective timestamp of the packet (allowing for the respective latency delay between server and client) to determine if the data is being rendered at the correct time. If not, then the ODRC 18 adjusts the rendering rate in order to synchronise the rendering of the data with its transmission by the IRDC. A buffer (not shown) may be provided (upstream of the rendering device 62) to allow the ODRC 18 to control the rendering rate in a manner the same as described above in relation to the rate control performed by the IDRC 16. Alternatively, the ODRC 18 may use a sample rate converter to control the rendering rate, or may adjust the render rate directly using a voltage controlled oscillator, or may use any other conventional means for adjusting the render rate.

The ODRC 18 advantageously also controls the rendering so that it is synchronised with any other ODRCs that are rendering their respective data (especially where the same, or associated, content is delivered to respective hosts 12). This may be achieved by the ODRC 18 by comparing the timestamps recovered from the incoming data traffic stream to the synchronized clock at the client host 12 to ensure that respective rendering devices render their data at the correct time. For example, if a data packet, e.g. the first packet, of the incoming traffic carries the timestamp T0, and if it is known that the system 10 introduces a delay (latency) L between the server and the client, then the ODRC 18 may determine that the corresponding data component is to be rendered at time T0+L, and can cause this to happen by reference to the synchronised clock signal.

In preferred embodiment, the ODRC 18 monitors the rate, e.g. the average bit-rate, of the incoming traffic stream, as well as the rate at which the media is rendered via device 62. Using these two values the ODRC 18 adjusts the time and/or rate at which the media signal, or components thereof, is rendered in order to synchronize the rendered media with the media signal streamed by the IDRC 16 of the server, advantageously to create smooth and uninterrupted rendering of the media. The ODRC 18 advantageously uses the recovered timestamp information along with the synchronized clock to ensure the rendering of the media at a precise and defined time.

Using a synchronized clock to implement rate control at the server (source) and client (rendering) devices ensures that the input data rate of a client host 12 closely matches its estimated input rate. Any error introduced due to uncertainties inherent to any such system may then be adjusted by the ODRC 18 by any suitable conventional means such as a clock drift compensation circuit or equivalent. The use of forward information transmission (e.g. of timestamp information) and clock synchronization allows the system 10 to operate without the need for a handshaking mechanism between the server and client.

In alternative embodiments (not illustrated), the hosts 12 need not implement direct clock synchronization. Instead, the rendering of data at the ODRC may be synchronized to the transmission by the IDRC by any other suitable means, for example by calculating the latency delay between a respective two client and server hosts (which may be done in the same manner used for the clock synchronization described above) but instead of using the calculated delay to synchronize clocks, the delay can be used directly to determine respective output rendering times assuming a constant output rendering rate. To this end output data controller may be cooperable with any suitable synchronization means configured to allow synchronization of the timestamps with its local clock signal (which may be considered to be an indirect method of clock synchronization).

Additional conventional processing, such as packet loss concealment, may be added to the processing chain of the server and/or client devices.

Preferred systems use data rate control at both inputs (represented by the IDRCs) and outputs (represented by the ODRCs) of the system 10 when the media (data) to be transferred comprises a media file, a stream or live-captured media. Removing the need for a handshaking mechanism between the servers and clients allows the system to easily scale to a large number of servers and/or clients.

Systems embodying the invention are typically required to exhibit relatively low latency. For low latency systems, putting the control of data flow at both inputs and outputs of the network removes the need for handshaking between the server and clients. This controlled flow of data also permits optimization and dynamic control of the size of any buffers required to temporarily store the data at data reception points. Such buffers are the main sources of high latency with conventional systems. Typical systems embodying the invention allow for end-to-end latencies of about 25 ms or greater for any type of media, compared to latencies of about 50 ms or greater for conventional systems.

The use of handshaking protocols in conventional systems limits the ability to scale the system up whilst maintaining low latency. When handshaking is used a system implicitly creates dependencies between all network endpoints within the system. Increasing the number of devices in a conventional system requires larger data buffers and increased latency in order to ensure reliable audio transfer under worst-case operational conditions. In addition, a conventional system using a handshaking mechanism must ensure that the resource utilization is well-distributed which involves more complex operation scheduling. By removing the handshaking mechanism preferred embodiments of the invention allow the number of devices to scale flexibly, including the presence of multiple distributed source devices, without impacting the overall system latency.

The invention is not limited to the embodiments described herein, which may be modified or varied without departing from the scope of the invention.

The invention claimed is:

1. A system for distributing data from a server to a client across a network, the server comprising:
    an input for receiving data from a data source, the data associated with an intended rendering rate; and
    an input data rate controller configured to control a transmission rate at which the data is sent from the server to the client via the network;
and the client comprising:
    an input for receiving data from the server via the network; and
    an output data controller configured to control rendering of the received data,
    wherein the input data rate controller is configured to control the transmission rate to match or substantially match the intended rendering rate, and to associate, with the data, a time data derived from a respective clock signal,
    and wherein the output data controller is configured to monitor a received data rate at which the data is received at the client, to compare the received data rate against a rendering rate at which the data is rendered at the client, and to adjust the rendering rate based on the comparison.

2. The system of claim 1, wherein the output data controller is configured to adjust the rendering rate the client to match or substantially match the transmission rate.

3. The system of claim 1, wherein the output data controller is configured to use the time data to control the rendering of the received data.

4. The system of claim 3, wherein the output data controller is cooperable with a synchronizer configured to allow synchronization of the time data with a respective clock signal of the client.

5. The system of claim 4, wherein the synchronizer comprises a clock signal synchronizer configured to provide the server and the client with respective synchronized clock signals.

6. The system of claim 5, wherein the output data controller is configured to use the time data and its synchronized clock signal to control the rendering of the received data.

7. The system of claim 1, wherein the output data controller is configured to use the time data to synchronize the rendering of the received data with the transmission of the data from the server to the client via the network.

8. The system of claim 7, wherein the output data controller is configured to synchronize the rendering of the received data with the transmission of the data by comparing the time data with a rendered time data at which the data is rendered and to determine if the rendered time data is consistent with the time data.

9. The system of claim 8, wherein the output data controller is configured to adjust the rendering rate to reduce any determined inconsistency between the rendered time data and the time data.

10. The system of claim 9, wherein the output data controller is configured to reduce the rendering rate upon determining that the received data rate is less than the rendering rate.

11. The system of claim 1, wherein the output data controller is configured to cause the rendering rate to match or substantially match the transmission rate.

12. The system of claim 1, wherein the output data controller is configured to monitor the received data rate at which the data is received at the client, to compare the received data rate against the rendering rate, and to adjust the rendering rate based on the comparison.

13. The system of claim 1, wherein, for successive portions of the data, the output data controller is configured to compare the time data created by the input data rate controller against a time at which an associated portion of the data is rendered in order to determine if the data is being rendered at the intended rendering rate.

14. The system of claim 1, wherein the output data controller is configured to use the time data to determine when to render the received data.

15. The system of claim 14, wherein the output data controller is configured to cause the rendering of the received data to begin at a time corresponding to the time indicated in the time data of a first received portion of the received data plus a time delay that is greater than or equal to a latency caused by the system when sending data between the server and the client.

16. The system of claim 15, wherein the output data controller is configured to cause the rendering of the received data to begin at a time corresponding to the time indicated in the time data of a first received portion of the received data plus a time delay that is greater than or equal to a latency caused by the system when sending data between the input data rate controller and the output data controller.

17. The system of claim 1, wherein the server sends the data simultaneously to a plurality of clients, and wherein each of the plurality of clients comprises an output data controller configured to use the time data to synchronize the rendering of the data at the client.

18. The system of claim 1, wherein the data is received from the data source at a fixed rate corresponding to the intended rendering rate, and wherein the input data rate controller is configured to control the transmission rate to match or substantially match the fixed rate.

19. The system of claim 1, wherein the data source comprises a data file, and wherein the input data rate controller is configured to control the transmission rate to match or substantially match a rendering rate associated with the data file.

20. The system of claim 1, wherein the data is received in a data stream across a network from the data source, and the input data rate controller is configured to control the transmission rate to match or substantially match a rendering rate associated with the data stream.

21. The system of claim 1, wherein the input data rate controller is configured to cause the data to be sent from the server to the client via the network at a substantially constant rate.

22. The system of claim 1, wherein the output data controller is configured to cause the received data to be rendered at a substantially constant rate.

23. The system of claim 1, wherein the network comprises is selected from the group consisting of a local area network (LAN) and a personal area network (PAN).

24. The system of claim 1, wherein the source data comprises is selected from the group consisting of audio data and video data.

25. A method for distributing data from a server to a client across a network, the method comprising:
receiving data from a data source, the data associated with an intended rendering rate;
controlling a transmission rate at which the data is sent from the server to the client via the network to match or substantially match the intended rendering rate;
prior to transmission across the network, associating with the data, a time data derived from a clock signal at the server;
receiving data from the server at the client via the network;
monitoring a received data rate at which the received data is received at the client;
comparing the received data rate against a rendering rate at which the data is rendered at the client; and
adjusting the rendering rate based on the comparison.

* * * * *